United States Patent [19]

Kläy

[11] Patent Number: 4,661,184

[45] Date of Patent: Apr. 28, 1987

[54] METHOD OF AND MEANS FOR PRODUCING A HELICAL BAND

[76] Inventor: Hans Kläy, 1171 Bougy, Switzerland

[21] Appl. No.: 782,866

[22] Filed: Oct. 2, 1985

[51] Int. Cl.[4] .............................................. B23P 15/26
[52] U.S. Cl. .................................... 156/185; 156/195; 156/246; 156/429; 156/501; 264/210.1; 264/216; 264/281; 425/319; 425/391
[58] Field of Search ...................... 264/216, 210.1, 281; 156/245, 246, 244.11, 190, 191, 195, 185, 187, 501; 174/40 R, 137 R, 140 R, 212; 425/319, 391; 29/159.3 AH

[56] References Cited

U.S. PATENT DOCUMENTS

| | | | |
|---|---|---|---|
| 2,350,987 | 6/1944 | Collings | 156/246 |
| 2,599,857 | 6/1952 | Mildner | 29/157.3 AH X |
| 2,654,124 | 10/1953 | Layte | 264/281 X |
| 2,812,794 | 11/1957 | Chapman | 29/157.3 AH X |
| 3,207,827 | 9/1965 | Kuehnle | 264/281 X |
| 4,102,027 | 7/1978 | Greever et al. | 29/157.3 AH X |
| 4,434,121 | 2/1984 | Schaper | 264/281 X |

FOREIGN PATENT DOCUMENTS 1394332 2/1965 France .............................. 174/40 R Primary Examiner—David Simmons
Attorney, Agent, or Firm—Steele, Gould & Fried

[57] ABSTRACT

A helical band is produced by applying a layer of heat-settable material on to a rotating support to one side of the axis of rotation. Heat is applied to the layer, as by the support while it rotates, for a length of time sufficient for the material in the layer to set to a required extent to form the band. The band is removed before it comes into contact with the material being applied on the support. The band is preferably made of electrically-insulating material so that it can be wound helically round and bonded to a cylindrical rod of electrically-insulating material to form a helically flanged insulator for use in an overhead electric power transmission line, the flange-forming band defining along the rod a helical leakage path of substantially uniform width.

13 Claims, 2 Drawing Figures

METHOD OF AND MEANS FOR PRODUCING A HELICAL BAND

BACKGROUND OF THE INVENTION

1. Field of the Invention

This invention relates to the production of a helical band that can advantageously be used to form a helical flange on an insulator in an overhead electric power transmission line.

With high-voltage and extra-high-voltage transmission lines, the line conductors are generally supported by lattice steel towers, or pylons, via suspension type insulators able to carry loads of up to 10 tons or more. These insulators are designed to minimize current leakage and prevent surface flashover in rain and fog or under conditions of atmospheric pollution. For safe operation, the insulators should define leakage paths between the ends thereof that are as long as possible in relation to the axial length of the insulators and of uniform width, as can be achieved with helically arranged flanges.

2. Prior Art

Such insulators have long been produced with helical flanges around a cylindrical core. German Patent Specification No. 1190072 of Apr. 5, 1963 describes how to form such flanges on a core-forming cylindrical rod. French Patent Specification No. 76.25859 of Aug. 26, 1976 describes a flange made of plastic material. Neither of these prior specifications show how to produce such a flange. In German Patent Specification No. 2905874.0 of Feb. 16, 1979 applicant describes a method of producing a band of plastic material between a pair of heated conical rollers and for applying the band to a substantially cylindrical rod of electrically insulating material to form an insulator with a helical flange.

SUMMARY OF THE INVENTION

An object of the invention is to provide a simpler way of producing a helical band.

According to one aspect of the invention there is provided a method of producing a helical band, which comprises applying a layer of fluid heat-settable material on to a rotating support to one side of the axis of rotation of the support, applying heat to said layer while rotating on the support for a length of time sufficient for the material in the layer to set in shape to a required extent to form the band, and removing the band from the support before the band comes into contact with the material being applied on to the support, the speed of rotation of the support, the distance travelled by the layer/band on the support and the temperature of the heat applied to the layer/band being such as to cause the required setting of the material in the layer.

The invention also provides a device for producing a helical band, which comprises a single rotatable support, means for applying a layer of fluid heat-settable material on to the support to one side of the axis of rotation of the support, means for applying heat to the layer while rotating on the support for a length of time sufficient for the material in the layer to set to a required extent to form the band, and means for removing the band from the support before the band comes into contact with the material being applied on the support, the support being rotated at a speed such and affording the layer/band a dwell time such as to cause the required setting of the material in the layer for a given layer-heating temperature.

As will have been apparent from the above background, the invention is of particular interest to the production of insulators for use in overhead electric transmission lines.

The invention therefore also provides a method of producing such an insulator, which comprises applying a layer of at least potentially electrically-insulating, fluid heat-settable, material on to a rotating support to one side of the axis of rotation of the support, applying heat to the layer while rotating on the support for a length of time sufficient for the material in the layer to set to a required extent to form a helical electrically-insulating band, removing the band from the support before the band comes into contact with the material being applied on to the support, the speed of rotation of the support, the distance travelled by the layer/band on the support and the temperature of the heat applied to the layer/band being such as to cause the required setting of the material in the layer, applying the band helically round a substantially cylindrical rod of electrically-insulating material and bonding the band to the rod to provide the rod with a helical flange such as to define a corresponding helical trough and, along the base of the trough, a helical leakage path of substantially uniform width.

The invention moreover provides apparatus for producing an insulator for use in an overhead electric power transmission line, which comprises a support rotatable about a vertical axis, means for applying a layer of fluid heat-settable material on to the support to one side of the axis of rotation of the support means for rotating the support while the layer is being applied thereon and for rotating the layer therewith, means for applying heat to the layer while rotating on the support for a length of time sufficient for the material in the layer to set to a required extent to form the band, and means for removing the band from the support before the band comes into contact with the material being applied on to the support and for applying the band helically round a substantially cylindrical rod of electrically-insulating material with a set pitch and bonding the band to the rod to provide the rod with a helical flange such as to define a corresponding helical trough and, along the base of the trough, a helical leakage path of substantially uniform width, the support being rotated at a speed such and affording the layer/band a dwell time such as to cause the required setting of the material in the layer for a given layer-heating temperature.

BRIEF DESCRIPTION OF THE DRAWINGS

In the accompanying diagrammatic drawings, given by way of example.

DETAILED DESCRIPTION

Figure 2:
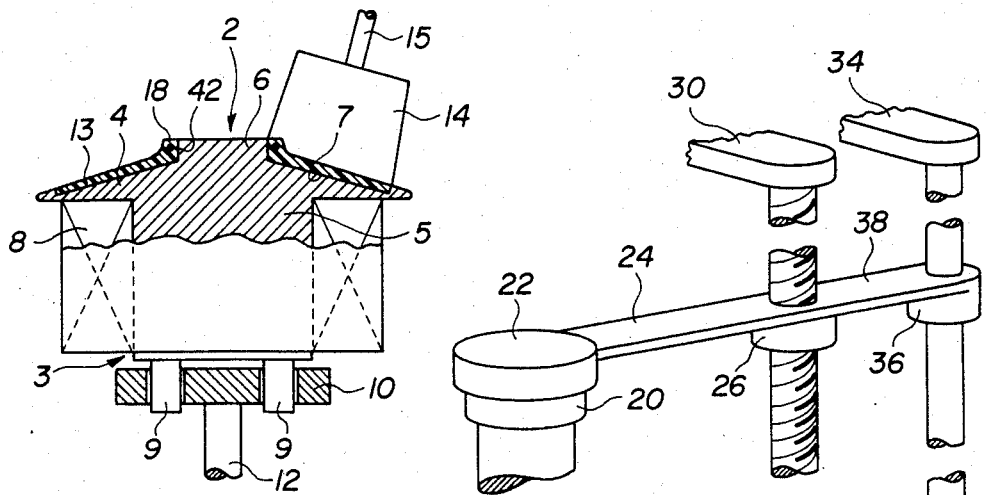
FIG. 2 is an axial section along line A—A of FIG. 1 through the device for producing a helical band.
Figure 1:
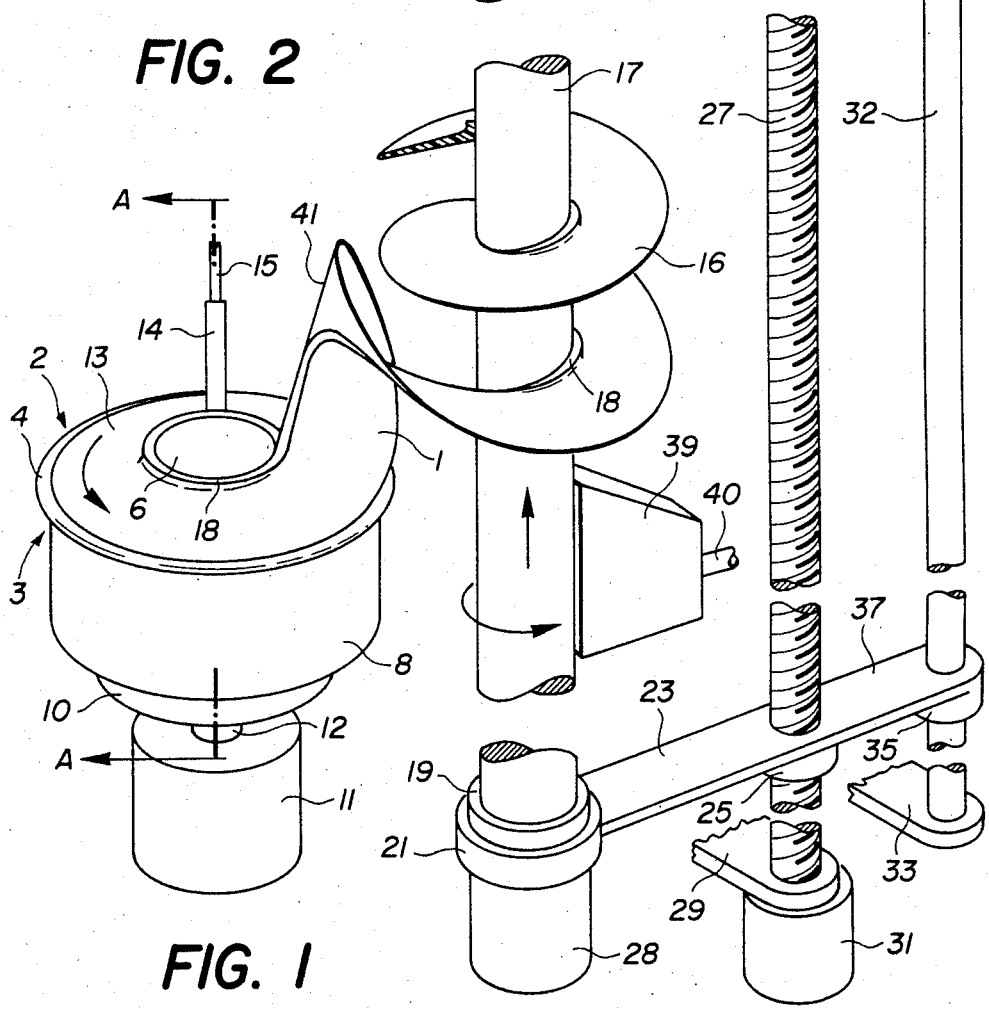
FIG. 1 is a perspective view of apparatus for producing an insulator for use in an overhead electric power line including a device for producing a helical band, in accordance with the invention.

In the illustrated apparatus, a helical band 1 about 3 cm wide is produced by a device 2 comprising a rotatable toadstool-shaped support 3 having a top 4 and a stalk 5. Top 4 has a central cylindrical boss 6 surrounded by a frusto-conical surface 7 sloping downwardly and outwardly. Stalk 5 extends through a stationary ring-shaped electric heater 8 and is fitted on its underside with a plurality of eccentric studs 9 engaging in a corresponding plurality of holes in a plate 10 of heat-insulating material such as porcelain. Plate 10 is rotatably driven by an electric motor 11 via shaft 12 secured to plate 10, and in turn rotates support 3 over the top annular surface of heater 8.

In operation, a layer 13 of fluid heat-settable material is applied at ambient temperature by a nozzle 14 on to surface 7 to one side of boss 6, nozzle 14 being supplied with the fluid material via a duct 15 from a source by e.g. gear pumps, not shown. Surface 7 is heated by heater 8 through top 4 and stalk 5 to a temperature such that the fluid material in layer 13 will have hardened sufficiently to be removed as band 1 before support 3 has completed one full revolution, i.e. before band 1 comes into contact with nozzle 14.

In the present example, band 1 is used in the production of an insulator for use in an overhead electric power transmission line and more particularly to form a helical flange or skirt 16 on a core-forming rod 17 of electrically-insulating material. For this, band 1 should, in addition to being electrically-insulating, be durable and weather resistant. Silicone rubber after many years of testing in the open air is a plastic material that has proved to be very suitable. The material extruded from nozzle 14 consists of a mixture of 90% by volume of "Silastic E" and 10% by volume of its corresponding catalyst, supplied by Dow Corning. With a layer 13, which varies in thickness from about 5 mm adjacent boss 6, where it forms a rising axially extending lip 18, down to under 1 mm along the radially outer edge of surface 7, the polymerization process that takes place can be completed in about 10 seconds when surface 7 is at a temperature of about 200° C. But a temperature of 100° C. will already produce satisfactory results, the polymerization time being then of course longer. In the present case, surface 7 is heated to a temperature of about 150° C. and band 1 is removed after a dwell time on surface 7 of about 20 seconds, with support 3 being rotated at about 2 rpm and band 1 being stripped off surface 7 after about ⅔ of a revolution. Surface 7 is preferably non-stick, e.g. lined with polytetrafluoroethylene.

The underside of layer 13 is formed by surface 7 and the topside by nozzle 14. The thickness of layer 13 is determined by the spacing between surface 7 and nozzle 14, such spacing being adjustable by relative displacement of support 3 and/or nozzle 14. With the above mixture, it is preferred to heat layer 13 off surface 7 rather than on both sides or from above, as is possible, since the topside of layer 13 then acquires a smooth brilliant finish which is desirable when band 1 becomes later a flange or skirt on an insulator.

Silicone rubber band 1 comes off surface 7 in a floppy, flexible, state and is then wound round rod 17. As shown, rod 17, which may have a length ranging from 3 to 10 meters depending on the voltage of the overhead lines in which the resulting insulator is to be used, is supported in an upright position, with both ends held by a pair of chucks 19 and 20 rotatably mounted in non-rotatable journal bearings 21 and 22 carried via arms 23 and 24 by nuts 25 and 26 mounted on a threaded shaft 27. Rod 17 is rotated by an electric motor 28 which is mounted on bearing 21 and whose drive shaft, not shown, extends through bearing 21 to engage chuck 19. Shaft 27 is journalled at its opposite ends in fixed brackets 29 and 30 and is rotated by the drive shaft, not shown, of an electric motor 31 mounted on bracket 29. Motors 11 and 28 are synchronous and motor 31 rotates at a speed such as to ensure coiling of band 1 around rod 17 with the required pitch.

To prevent arms 23 and 24 swinging angularly, the illustrated apparatus further comprises a smooth rod 32 having a length similar to that of shaft 27 and arranged parallel thereto. Rod 32 is mounted at its opposite ends in fixed brackets 33 and 34 and carries sleeves 35 and 36 which are rigidly linked to nuts 25 and 26 by arms 37 and 38 and which slide on rod 32 along with nuts 25 and 26 on shaft 27. Shaft 27 and rod 32 have a length over twice that of rod 17.

Before band 1 is wound on rod 17, a layer of adhesive and protective material that sets at ambient temperature, e.g. Dow Corning silicone adhesive 732, is applied continuously to rod 17 by a stationary nozzle 39 supplied via a duct 40 from a source, not shown, such as to coat substantially its entire surface. Band 1 is transferred to rod 17 in such a way that its smooth topside on support 3 remains the topside around rod 17, with lip 18 still directed upwardly. To achieve such a transfer, band 1 forms a loop 41 in mid-air. As it is wound on rod 17, the inside of lip 18 comes into contact with the adhesive and protective material applied by nozzle 39 and becomes bonded to rod 17 to form thereon helical flange or skirt 16.

Boss 6 has a circumference such as to correspond to one turn of skirt or flange 16 around coated rod 17, measured along the inside of lip 18. With a flexible and floppy band 1, as is used in the present example, it is important that band 1 be properly wound on rod 17 since it is otherwise likely to have a wavy configuration round rod 17 instead of a constant radial angle in relation to rod 17 and a constant helical slope down skirt or flange 16, as required. Proper winding of band 1 on rod 17 is achieved by suitably choosing the speeds of rotation of motors 11, 28 and 31.

To avoid band 1 becoming distended while being wound on rod 17, an inextensible filament or thread 42 made of electrically-insulating material, e.g. nylon, is included in layer 13 along the radially inner edge thereof. Filament or thread 42 is best fed in with the mixture through nozzle 14 so as to be coated with mixture before becoming embedded in layer 13. In so doing, filament or thread 42 is prevented from coming into direct contact with boss 6 and becoming exposed in band 1.

By providing support top 4 with a frusto-conical surface 7 as shown, skirt or flange 16 can be made to have a corresponding radial slope on rod 17, thereby making it possible for rain water falling on a finished insulator hanging substantially vertically to run off skirt or flange 16 along its free edge instead of the water running helically all the way down skirt or flange 16. The removal of the water is also helped by the smoothness of the topside of skirt or flange 16.

Skirt or flange 16 along rod 17 defines a helical trough with the bottom thereof forming a helical leakage path of substantially uniform width and of extensive length in relation to the axial length of rod 17.

Various modifications may be course be made to the described illustrative embodiment without departing from the scope of the invention as defined by the following claims. Besides the above set forth mixture, other materials may be used to form layer 13 depending on the use to which band 1 is to be put. It suffices for the material to be able to flow on to surface 13 and to form thereon a layer which, by the action of heat, will set into a firm and durable band. At times, the band may be flexible and floppy, as described above, and at other times the band may become rigid depending on the starting material used. With materials that harden into a rigid condition, the layer/band may be stripped off surface 7 before it fully hardens and wound on a core-forming rod as above with spaced apart turns, the final hardening then occuring on the rod.

Band 1 need not be wound on a core-forming rod immediately it comes off surface 7 and may be stored in the form of a helical stack of any desired length for ulterior use, possibly elsewhere. When the material is flexible and floppy, the turns of the helical band will rest directly on top of each other and any subsequent winding on a core-forming rod may be carried out as described earlier. When the material becomes rigid, the turns of the helical band would need to set in the spaced apart relationship they are expected to have in their subsequent use. If the resultant helical band is intended for subsequent use on a core-forming rod, the helical band is then slipped axially over the rod and bonded thereto once in position.

Since boss 6 has a greater diameter than rod 17, an alternative arrangement for the illustrated apparatus is for support 3 to be formed with a cylindrical axial passage having a diameter somewhat greater than rod 17 such that rod 17 may rise and turn inside support 3 and that the layer/band may be wound directly on rod 17 without having to form loop 41. In such an event, nozzle 14 is shaped and arranged so as not to interfere with band 1 as it is wound on rod 17 and the means for rotating support 3 would need to be redesigned so as not to interfere with rod 17, e.g. by replacing studs 9 by an externally cogged crown wheel meshing with a pinion made of heat insulating material and driven by a motor.

Surface 7 may have any required shape, e.g. substantially planar or dished, depending on subsequent use.

Core-forming rod 17 may be made from a variety of materials. In the above described and illustrated embodiment it is formed of glass fibres bonded by a plastic adhesive material, e.g. epoxy.

I claim:

1. A method of producing a helical band, which comprises the steps of:
   applying a layer of fluid heat-settable material onto a rotating support to one side of an axis of rotation of the support;
   applying heat to said layer while rotating the support for a length of time sufficient for material in the layer to set in shape to a required extent to form a length of the helical band; and,
   removing the band from the support before the band comes into contact with the material being applied onto the support, a speed of rotation of the support, a distance traveled by the layer/band on the support and the heat applied to the layer/band being such as to cause the material in the layer to set in shape.

2. A method as in claim 1, which further comprises including an electrically-insulating inextensible thread in said layer, as said layer is applied, along an inner edge portion thereof.

3. A method as in claim 1, wherein heat is applied to said layer solely by the support.

4. A method of producing an insulator for use in an overhead electric power transmission line, which comprises the steps of:
   applying a layer of at least potentially electrically-insulating, fluid, heat-settable, material onto a rotating support to one side of an axis of rotation of the support,
   applying heat to the layer while rotating the support and the layer applied thereto for a length of time sufficient for the material in the layer to set in shape to a required extent to form a helical electrically-insulating band,
   removing the set-in-shape band from the support before the band comes into contact with the material being applied onto the support, a speed of rotation of the support, a distance travelled by the layer/band on the support and the heat applied to the layer/band being such as to cause the required setting in shape of the material in the layer, and,
   applying the band helically around a substantially cylindrical rod of electrically-insulating material and bonding the band to the rod to form the rod with a helical flange such as to define a corresponding helical trough and, along a base of the trough, a helical leakage path of substantially uniform width.

5. A method as in claim 4, which further comprises coating the rod with electrically-insulating bonding material before applying the band helically on the rod.

6. A device for producing a helical band, comprising:
   a support rotatable about a substantially vertical axis,
   means for applying a layer of fluid heat-settable material onto an upper side of the support at one side of the axis of rotation of the support,
   means for applying heat to the layer while rotating the layer on the support for a length of time sufficient for the material in the layer to set in shape to a required extent to form the band, and
   means for removing the band from the support before the band comes into contact with the material being applied onto the support, the support being rotated at a speed and affording the layer/band a dwell time on the support such as to cause the required setting of the material in the layer for a given layer-heating temperature.

7. A device as in claim 6, wherein the support has an upper surface for receiving said layer and which is designed to form one side and the edges of the band, and wherein the means for applying said layer on to said surface include a nozzle having an outlet designed to form the opposite side of the band, the distance between said surface and said nozzle determining the thickness of the layer.

8. A device as in claim 6, wherein said surface is non-stick.

9. The device of claim 6, wherein the support is conical, whereby the helical band defines a radial slope.

10. Apparatus for producing an insulator for use in an overhead electric power transmission line, comprising:
    a rotatable support,
    means for applying a layer of fluid heat-settable material onto the support to one side of an axis of rotation of the support,
    means for applying heat to the layer while rotating on the support for a length of time sufficient for the material in the layer to set in shape to a required extent to form the band, and means for removing the band from the support before the band comes into contact with the material being applied onto the support and for applying the band helically round a substantially cylindrical rod of electrically-insulating material with a set pitch, and bonding the band to the rod to provide the rod with a helical flange such as to define a corresponding helical trough and, along a base of the trough, a helical leakage path of substantially uniform width, the support being rotated at a speed and affording the layer/band a dwell time such as to cause the required setting in shape of the material in the layer for a given layer-heating temperature.

11. Apparatus as in claim 10, wherein the last-mentioned means include means for coating the rod with electrically-insulating bonding material before the band is applied helically round the rod.

12. Apparatus as in claim 10, wherein the radially inner edge of the layer/band is defined by a circular central boss on the support, having a circumference corresponding to one turn of the radially inner edge of the band round the rod.

13. The device of claim 10, wherein the support is conical, whereby the helical band defines a radial slope along which water can run off the insulator.

* * * * *